July 21, 1970 S. N. SCHLEIN 3,521,596

LOCATION MARKER

Filed June 13, 1967 5 Sheets-Sheet 1

INVENTOR.
Seymour N. Schlein
BY J. D. Douglas
His atty

July 21, 1970

S. N. SCHLEIN 3,521,596

LOCATION MARKER

Filed June 13, 1967

INVENTOR.
Seymour N. Schlein
BY
J. D. Douglas
His atty

July 21, 1970  S. N. SCHLEIN  3,521,596
LOCATION MARKER

Filed June 13, 1967  5 Sheets-Sheet 5

INVENTOR.
Seymour N. Schlein
BY J. W. Douglass
his atty

3,521,596
LOCATION MARKER

Seymour N. Schlein, University Heights, Ohio, assignor to The Fanner Manufacturing Company, a division of Textron Inc., Cleveland, Ohio, a corporation of Rhode Island
Continuation-in-part of application Ser. No. 593,100, Nov. 9, 1966. This application June 13, 1967, Ser. No. 660,536
Int. Cl. G08b
U.S. Cl. 116—63      10 Claims

ABSTRACT OF THE DISCLOSURE

A location marking device having a plurality of circumferentially spaced, brightly colored curved plastic tube members. These members can be secured to lines near air fields to mark their location, or they may also be mounted on a base for use as markers on a surface such as a roadway, or fields, or used as marker buoys on water. The tubes are arranged to present an optical illusion of rotation when viewed by a person in a moving vehicle.

---

This in a continuation-in-part of application Ser. No. 593,100, filed Nov. 9, 1966, entitled, Location Marking Device, now abandoned.

This invention relates generally to location markers and more particularly to light weight plastic markers suitable for marking work areas or restricted areas on roads or in construction zones, for marking courses to be followed in open terrain, for marker buoys on water, for marking guys on lines near air fields or for any other location marking that is required.

The present invention provides a location marker comprised at least in part of extruded and/or molded resilient members which affords a light weight inexpensive location marker extremely versatile in its uses which is easy to transport and store and which by affording an optical illusion of rotation will quickly attract attention at a substantial distance so its presence is easily and quickly noticed. The present invention also contemplates such location markers which are provided with lighting means so that they are operable at night. The improved marker of this invention also is extremely light in weight, economical of manufacture, rugged and durable, and requires little maintanance. It can be roughly handled and is capable of absorbing impact shock from vehicles without substantial damage. Its construction is such, that although light in weight, it has very small wind resistance and therefore is not apt to be blown over as are conventional markers. The construction also allows the marker to be locked or secured with a chain to prevent pilferage. When it is to be used on a flat surface it is preferably formed in two independent sections, i.e., an upper or marker section and a lower or base section each of which can be replaced individually if damaged.

Still other advantages of the invention will become more apparent from the following description of several embodiments thereof which are illustrated by the accompanying drawings, and form a part of this specification.

In the drawings:

FIG. 4 is a plan view of a modified form of the base shown in FIG. 3;

Briefly, this invention contemplates the provision of a location marker having a base member on which is supported an upper member comprised of a plurality of plastic members such as tubes upwardly extending from the base. If desired, the tubes or other members may be mounted to the base member in such a way that they are free to rotate under the action of the wind so that the marker will be more eye-catching. The marker may also be formed to provide a light in the base which will illuminate the marker for after dark operation. The marker may also be constructed in such a manner that markers may be compactly stacked, one on top of the other, and preferably in two separate sections so that the bases may also be stacked independently of the upper members and the upper members stacked independently of the bases. Also this invention contemplates a location marker which can be attached to guys or other lines around an airfield comprised of a plurality of curved tubular members and means for securing the members to the guy or line.

Figure 1:
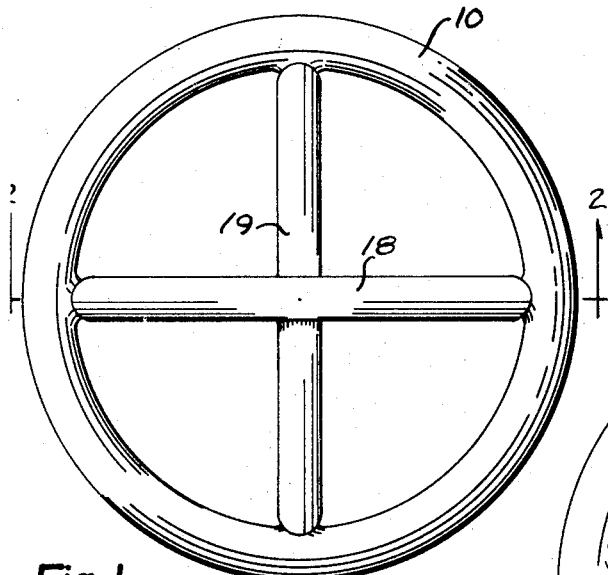
FIG. 1 is a plan view of one embodiment of a location marker according to this invention.
Figure 3:
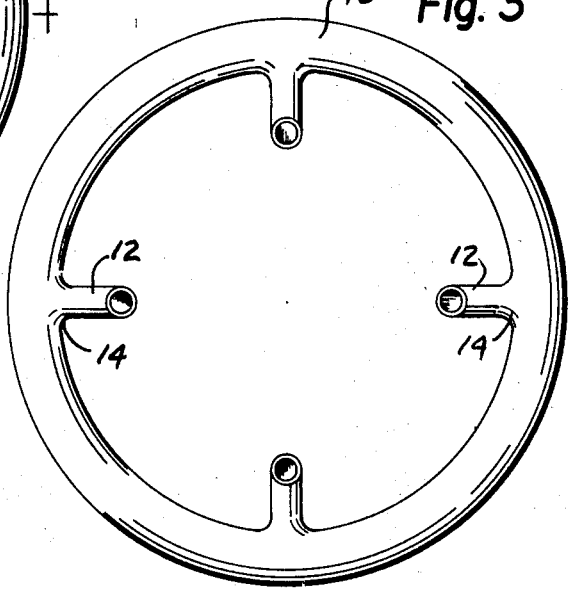
FIG. 3 is a plan view of the base of the device of the embodiment of FIG. 1.
Figure 2:
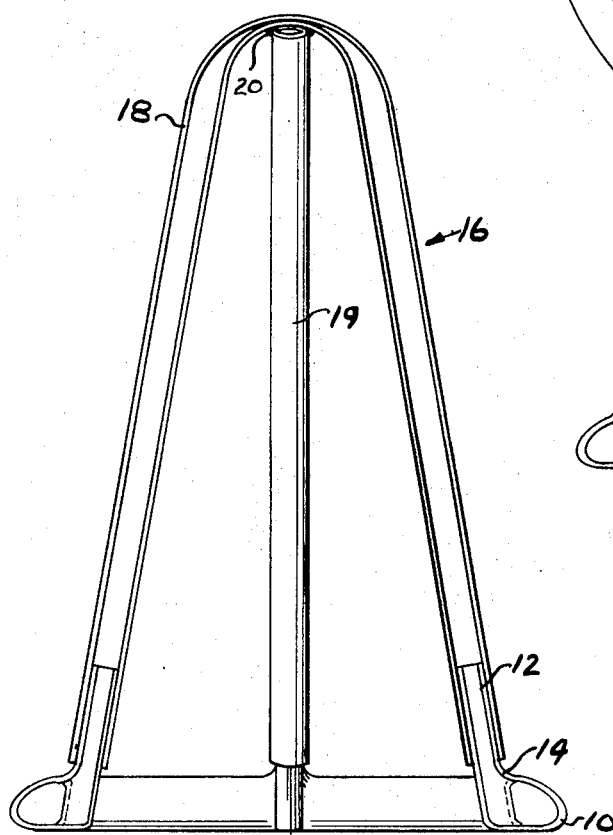
FIG. 2 is a sectional view taken substantially on the plane designated by the line 2—2 of FIG. 1.

More specifically, and referring for the present to FIGS. 1 through 3, of the drawings, one embodiment of a location marker according to this invention is shown. The marker includes a hollow, annular tubular base member 10 having four hollow legs 12 extending obliquely inwardly and upwardly. The legs 12 are circumferentially spaced around the base member 10 and each leg has a radially inwardly extending portion 14 connecting it to the base 10. This particular construction of the legs 12 being radially offset inwardly allows for easy stacking of bases one on top of another for compact storage and shipment when the bases are to be stacked independently of the remainder of the location marker. The base member 10 is preferably formed from a resilient material such as plastic and may conveniently be formed by injection molding. Also, the base could be of any desired shape, but normally the annular configuration will prove to be the best and most convenient.

A generally dome-shaped upper section 16 is provided extending upwardly from the base 10. The upper section 16 includes a pair of curved generally dome-shaped resilient plastic tubular members 18 and 19. The ends of the tube members 18 and 19 are telescoped over the legs 12 and cross each other at their tops, which preferably are heat sealed together as at 20. The plastic tubes 18 and 19 are preferably of brilliant eye-catching contrasting colors so that they will quickly catch a viewer's eye and will be readily visible. Another advantage of having the tubes 18 and 19 made of different colors is that when the device is used as a location marker on a highway and an automobile is approaching, the perspective of the driver of the automobile in viewing the marker will change, thus changing the apparent relative positions of the tube members 18 and 19 with respect to each other. Thus, the on-coming driver will be presented with an optical illustion of rotation of the device even though the device is stationary. This is a particularly eye-catching feature of the location marker. This illusion will also be presented, but not so markedly even if the tubes are of the same color. Also, iridescent or fluorescent plastic may be used to make the markers more conspicuous for night use.

The tube members 18 and 19 can be sealed to the legs 12 to provide a permanent joint, or they may be held in place by a friction fit which will allow the markers to be disassembled and the bases and upper portions stored separately. In either case, the two section constructions will permit replacement of either the bases or upper sections separately if either becomes damaged. Hence, a damaged marker need not be lost completely which is a big advantage over the prior art. It is to be understood that although it is preferred that the marker be of two piece construction, i.e., a base section and an upper section, the marker could be molded as a single piece if desired.

In order to provide greater stability of the marker the base may be formed of a heavier material such as a metal or alloy or if formed of a light weight material such as a hollow plastic the base may be filled with sand or water or other ballast material to lower the center of gravity, thus increasing the stability of the device.

Figure 5:
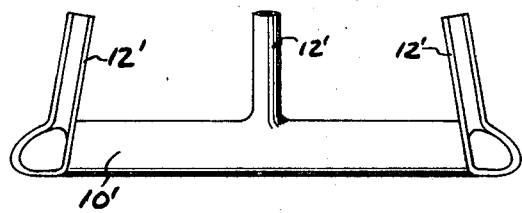
FIG. 5 is a sectional view taken substantially on the plane designated by the line 5—5 of FIG. 4.

Referring now to FIGS. 4 and 5, a modification of the base 10' is shown in which the legs 12' extend directly upward from the tubular base member 10'. In this embodiment the legs 12' are not radially displaced inwardly as in the embodiment of the base shown in FIG. 3. This type of base cannot be stacked in quite as compact a stack as the bases of FIG. 3, but slightly less material is needed and the moulding of such a base is somewhat simpler than the embodiment of FIG. 3. The upper section 16 is placed on this base just as in the previous embodiment.

Figure 6:
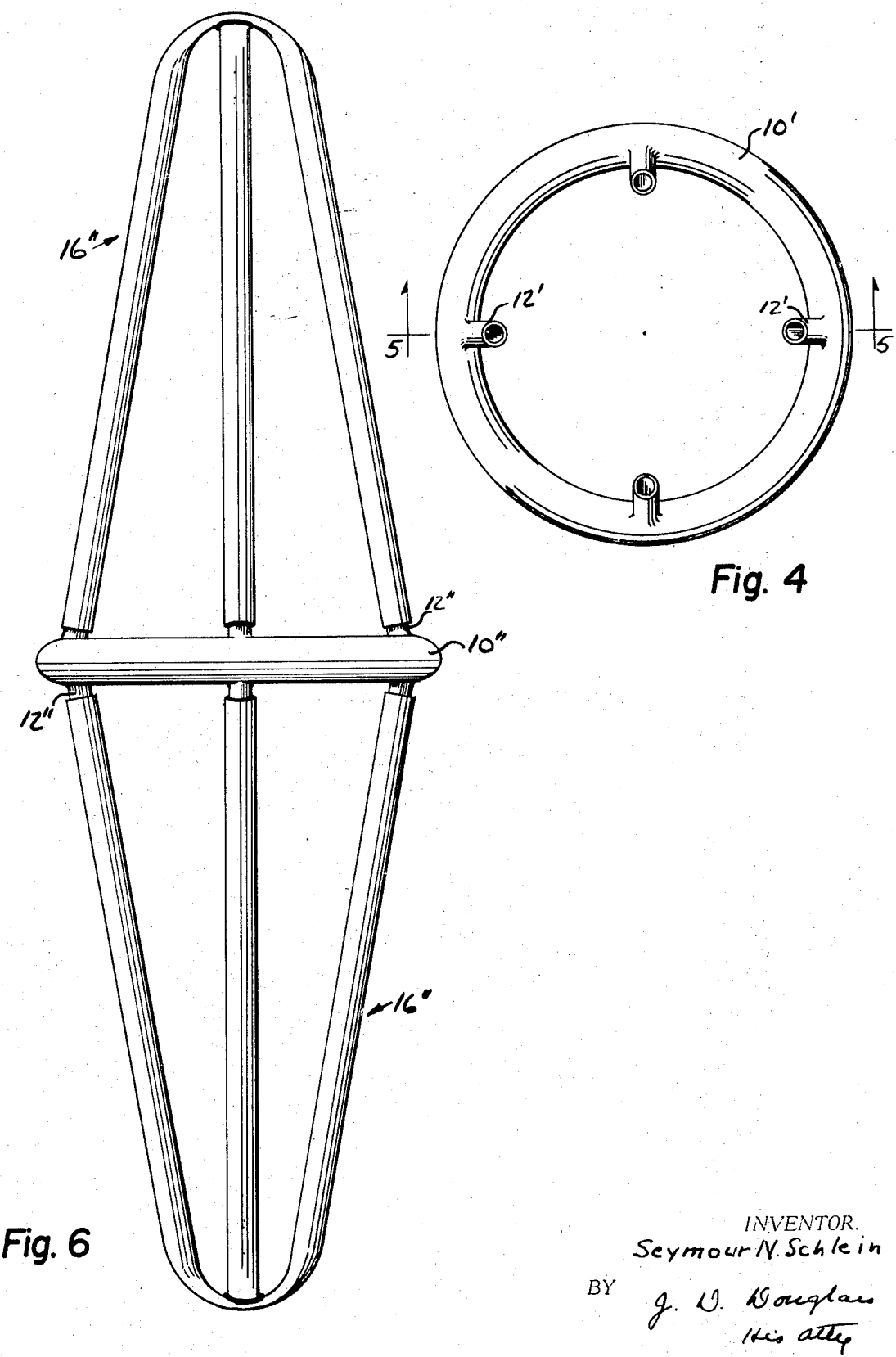
FIG. 6 is an elevational view of a marker especially adapted for marine use.

FIG. 6 shows a modification of the marker of FIGS. 4 and 5, which is especially adapted for marine use as a marker buoy, although the other embodiments may also be used as such. In this embodiment, a base member 10" is provided which has circumferentially spaced legs 12" extending both upwardly and downwardly. The dome shaped sections 16" are provided of similar configuration to those of the previously described embodiments. With this construction even if the buoy capsizes there will be a portion of the buoy visible above water.

Figure 7:
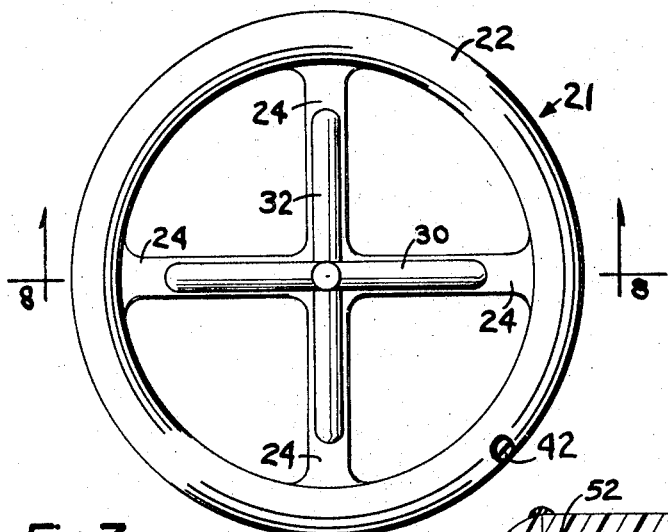
FIG. 7 is a plan view of another embodiment of the location marker according to this invention.
Figure 8:
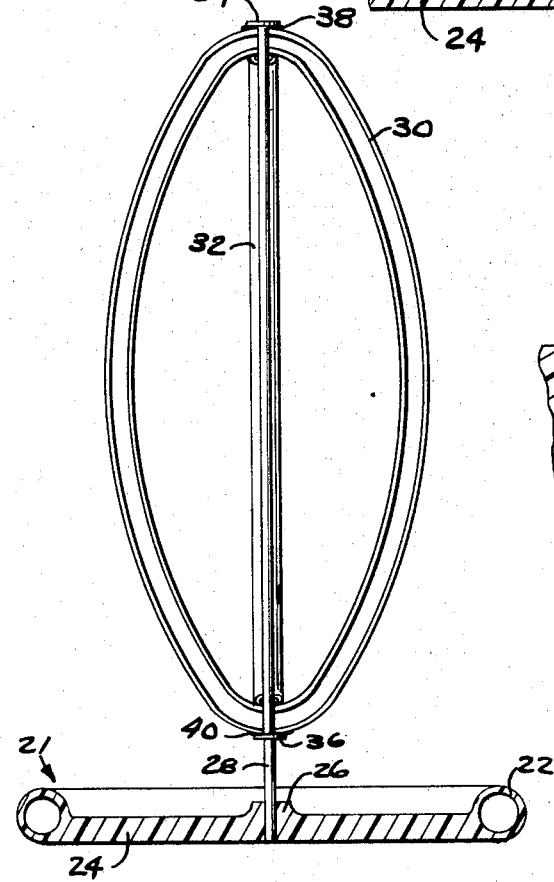
FIG. 8 is a sectional view taken substantially on the plane designated by the line 8—8 of FIG. 7.

Referring now to FIGS. 7 and 8, another embodiment of a location marker according to this invention is shown. In this embodiment a base member 21 is provided which has an annular hollow outer ring 22 and intersecting hollow spoke-like members 24. As in the previous embodiments, the base 21 preferably is moulded from resilient plastic, although it could be formed from a heavier material such as metals or alloys. The spoke-like members 24 intersect at a hub section 26 which supports an upwardly extending rigid rod 28. A pair of generally eliptical plastic tube members 30 and 32 are supported on the rod 28. Upper and lower caps 34 and 36, respectively, are provided on the rod 28 to contain the tube members 30 and 32, and the tube 30 is preferably heat sealed to the caps 34 and 36, as shown at 38 and 40. As in the previously described embodiments preferably the tubes 30 and 32 are made of bright, contrasting colors so that they will be eye-catching and readily visible for location marking. It is also contemplated that the tubes 30 and 32 could be free of connections with the caps and hence free to rotate on the rod 28 under the action of wind. This rotation is eye catching and makes the device more noticeable. Also it is contemplated that fins or vanes may be provided on the tubes to increase propensity to rotate and cause rotation even under gentle winds which would not cause rotation of just the tubes. Also, in this embodiment, closure plug 42 is provided in the base 21 to allow it to be filled with sand, water or other ballast material if it is made from a lightweight material. In addition to its uses on land, this embodiment may be used as a marine marker buoy. This embodiment also can have either the base or the upper portion replaced separately.

Figure 9:
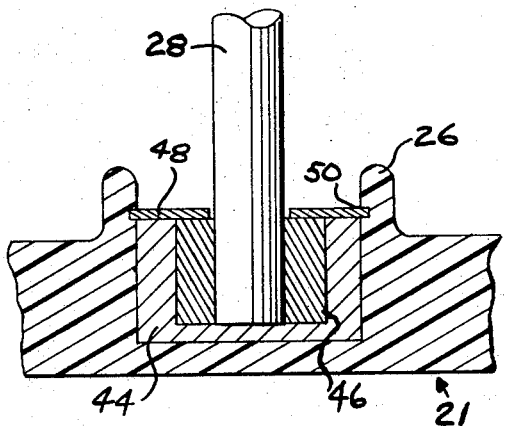
FIG. 9 is an enlarged detailed view of a different mounting for the central rod of the device of FIG. 7.

Referring now to FIG. 9, a modification of the embodiment of FIGS. 7 and 8 is shown wherein a mounting for the rod 28 is provided which will permit the rod 28, and hence the whole upper section, to be swivelled or rotated under the action of any wind. In this embodiment the hub 26 of the base 21 is provided with an insert bearing material 44 and the end of the rod 28 is provided with a bearing sleeve 46. A snap-in hold down ring 48 is provided which snaps into a groove 50 formed in the hub 26 and snaps over the sleeve 46 to hold the bottom of the rod 28 in place. With this type of mounting the rod 28 is freely rotatable and the whole upper section of the marking device will rotate when wind of sufficient velocity strikes the tubes 30 and 32. In this embodiment also fins or vanes may be provided on the tubes to increase the propensity of the top to rotate.

Figure 10:
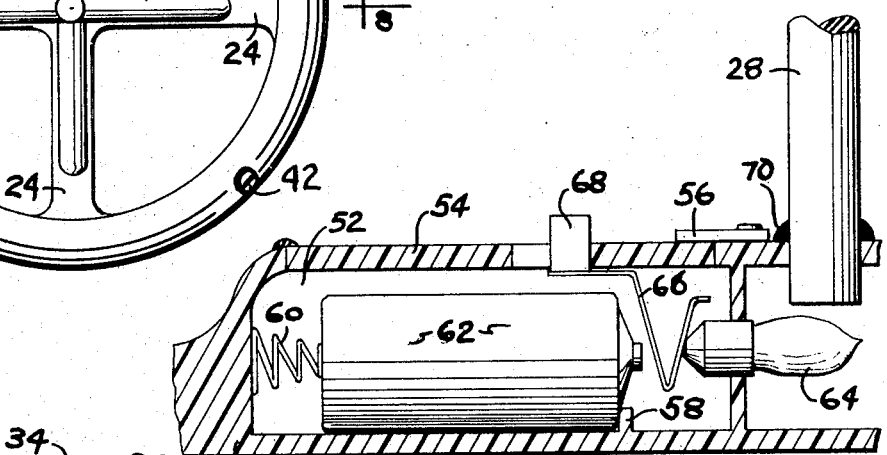
FIG. 10 shows a modification of the base of the device of FIG. 7 to incorporate lighting means.

Referring now to FIG. 10, a modification of the device or FIGS. 7 and 8 is shown which can be lighted and is suitable for use after dark. In this embodiment, one of the spokes 24 is provided with a cavity 52 extending into the hub 26. A hinged cover 54 is provided to close the cavity 52 and suitable weather-stripping (not shown) is provided to make the cavity water-tight. A slide lock fastener 56 is provided to tightly close the hinged cover 54. A stop wall 58 is formed within the cavity 52 extending upwardly from the bottom thereof. One end wall of the cavity 52 has secured thereto a biasing spring 60. A battery 62 of a conventional type can be mounted in the cavity 52 between the biasing spring 60 and the stop wall 58. A lamp 64 is provided within the cavity 52 and extending in the hub 26. The lamp 64 is connected to an actuation spring 66 which in turn is operable by an on-off button 68 mounted on the hinged top 54. In this embodiment the central rod 28 extends only part way into the hub 26 with the lamp 64 underlying the rod. In this embodiment it is preferred that the rigid rod 28 be formed of a transparent or translucent material, such as Lucite plastic (a Du Pont Co. trademark for an acrilic resin) and be heat sealed in the hub as shown at 70. With this embodiment the marker can be lighted for after dark service. It is to be understood that the location of the battery and the lamp are merely illustrative and could be positioned at various locations in the base, or even could be supported on top of the base. In addition a suitable flashing mechanism could be incorporated in the structure.

An additional desirable feature of all of the embodiments is that the markers can be secured against pilferage. A chain or cable can be looped around one of the upper tubes or around the base, or both and then locked to a nearby permanent object such as a tree, or a ground anchor or the like. The open construction of the markers permits such securing.

Figure 11:
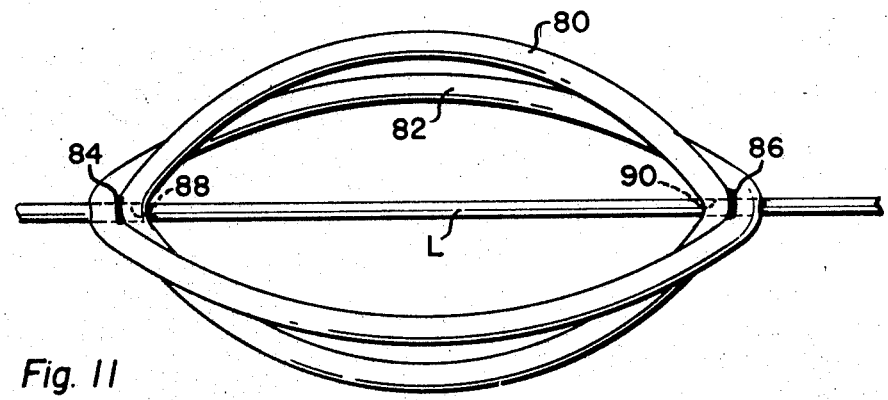
FIG. 11 is an elevational view of another embodiment of a location marker and is of the type that is suitable for marking guys or lines and is shown secured on a line.

Referring now to FIG. 11, an embodiment of the invention adapted for use to mark electrical lines, guys or other lines is shown. This particular embodiment is particularly adapted for use on lines which are being installed. The device includes a pair of generally elliptical shaped plastic members 80 and 82. The members 80 and 82 engage each other and are joined preferably by heat sealing at two places 84 and 86. As in the previous embodiments, the members 80 and 82 are preferably made of brightly colored plastic tubes and it is particularly desirable, but not necessary, that the plastic be of an iridescent or fluorescent nature. At the places 84 and 86 where the members are heat sealed together, there are provided apertures 88 and 90, respectively. When the line on which the marking device is to be used is being installed, the line L is threaded through the two apertures 88 and 90. The apertures are formed with a diameter equal to the diameter of the line or just slightly larger so that when the line is disposed in the apertures a snug fit results but nevertheless one in which the device may rotate under the action of the wind or vibration in the line. The natural sag of the line will prevent any appreciable movement lengthwise of the device on the line but the rotational movement may take place.

Figure 12:
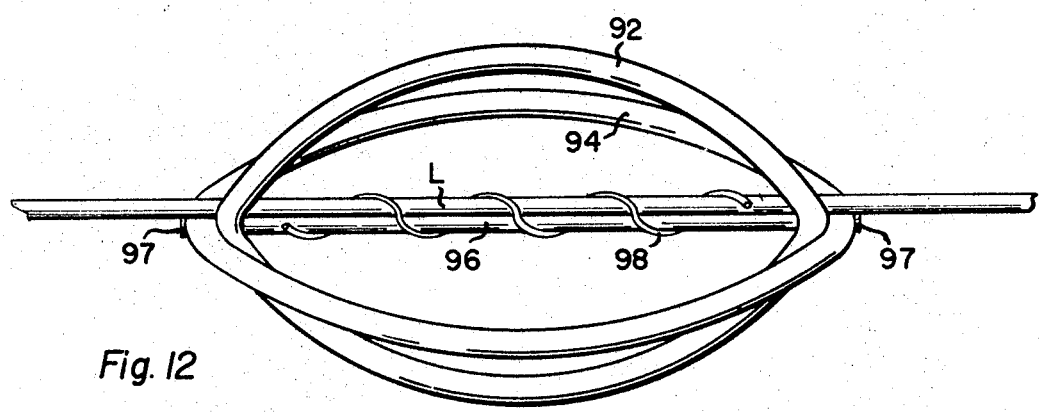
FIG. 12 is a view similar to FIG. 11 of another embodiment of a line marker shown installed on a line.

Referring now to FIG. 12, another embodiment of the marking device suitable for use on lines is shown. This particular embodiment is adapted for installation on existing lines and is not restricted to use in initial construction when the lines are being secured. In this embodiment a pair of elliptically shaped plastic members 92 and 94 are provided which are similar to the members of the embodiment of FIG. 11. Again these plastic members preferably are formed of tubular plastic of bright colors and preferably either iridescent or fluorescent in nature. A straight central member 96 is provided, which is secured to the members 92 and 94 at its opposite ends by caps 97. This central member 96 is preferably made of a relatively rigid plastic material and may be either a solid rod or a hollow member. The device is clamped to the line by a clamping device which preferably takes the form of a helically preformed, resilient armor rod 98. To secure the device to the line, the central member 96 is placed alongside of the line and the clamp rod 98 is wrapped around both the line L and the straight rigid central member 96, thus securing the marker device to the line. This type of clamping device will prevent longitudinal movement of the marking device on the line and also will limit any rotative or oscillating movement of the device on the line.

Figure 13:
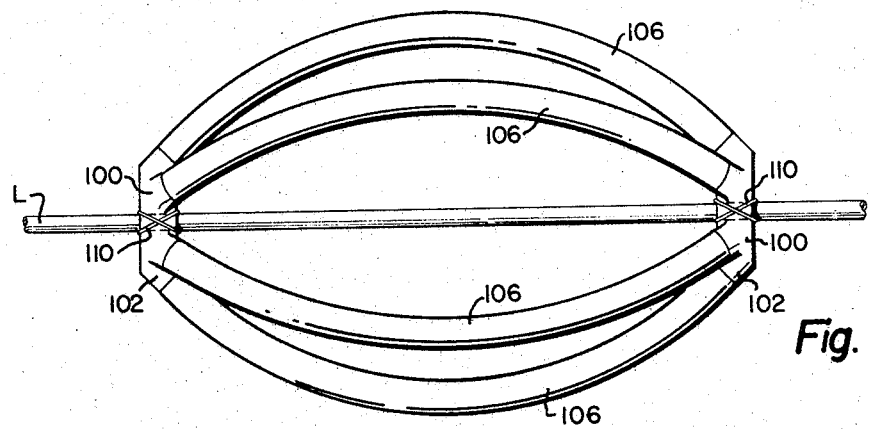
FIG. 13 is an elevational view of another embodiment of the marker of this invention for use in marking lines.
Figure 14:
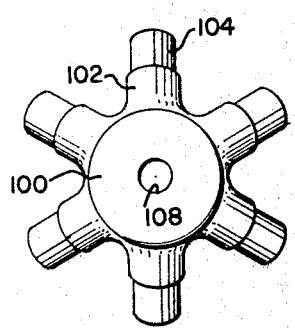
FIG. 14 is an end view of the end cap of the device of FIG. 13.

Referring now to FIGS. 13 and 14, another embodiment of the marking device according to this invention is shown which is also particularly adapted for use in marking electrical lines, guys or other lines. As in the case of the device of FIG. 11, this device is adapted for use on lines which are being installed. In the embodiments of FIGS. 13 and 14 the marking device includes a pair of identical end caps 100, one of which is shown in detail in FIG. 14. Each of the end caps 100 is provided with a plurality of spaced obliquely extending fingers 102, each finger having a reduced diameter end portion 104. A plurality of lengths of plastic tube members 106 are telescoped over the reduced end portions 104 and extend between and interconnect the end caps 100. The tubes 106 are preferably secured to the end caps 100 by some type of adhesive to make a semipermanent connection, but nevertheless one which can be broken if necessary. Each of the end caps 100 is provided with a through central aperture 108. As the line L is being installed it is threaded through the apertures 108 and the marking device is then slid along the line to the desired position. If desired, some suitable form of a tie can be provided which is shown in the form of lashings 110 to secure the end caps, and hence the marker device, in the selected position on the line. Since the line must be threaded through the apertures 108, this particular embodiment shown in FIGS. 13 and 14 can be utilized only on a new construction of lines.

Figure 15:
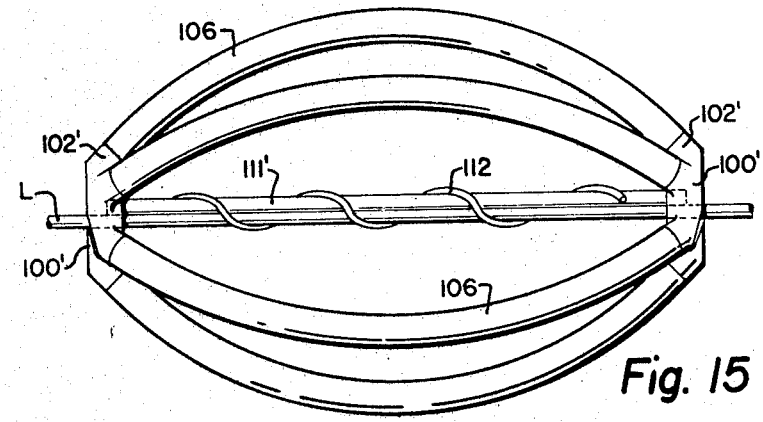
FIG. 15 is an elevational view of still another embodiment of the marker of this invention for use on marking lines.
Figure 16:
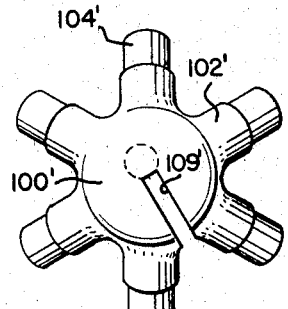
FIG. 16 is an end view of the end cap of the device of FIG. 15.

Another embodiment of the marker device which can be used either on new line construction or on existing line construction, is shown in FIGS. 15 and 16. In this embodiment a pair of end caps 100' are provided, each of which have fingers 102' with reduced end portions 104'. Tube members 106 extend between the end caps 100'. In this embodiment an elongated slot 109' is provided in each of the end caps so that the slots may be slid over the line L to be engaged thus permitting the device to be installed on existing wires as well as on new installation of wires. In the embodiments of FIGS. 15 and 16 a central rigid support member 111' is provided which extends between the end caps 100' and is secured to each of them. A helical preformed element 112, similar to that shown in FIG. 12, is provided in this embodiment to secure the device to the line.

It is to be understood that if desired the central member 111' can be omitted from the embodiment shown in FIGS. 15 and 16 and the device secured to the lines with lashings similar to those shown in FIG. 13. Conversely a central member similar to that shown at 111' in FIG. 15, can be provided in the embodiment shown in FIG. 13 and a helical preformed element be used to secure the device to the line L as described.

As described in the previous embodiments, it is preferred that the tube members be brightly and contrastingly colored so as to quickly attract and hold attention of the viewer.

Figure 17:
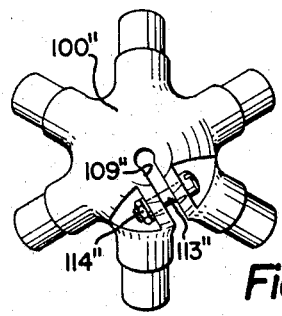
FIG. 17 is an end view of another type end cap.
Figure 18:
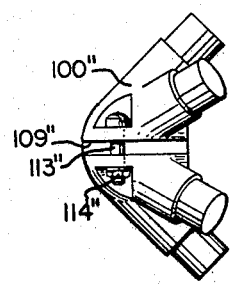
FIG. 18 is a side elevational view of the cap of FIG. 17.

Referring now to FIGS. 17 and 18 another embodiment 100" of the end caps which can be used in place of the end caps shown in either FIGS. 13 or 15 is shown. A marking device using these end caps can be used on either new line construction or can be installed on existing lines. In this embodiment a keyhole shaped slot 109" is provided. Unnumbered apertures are located on each side of the slot 109" through which a bolt 113" can be passed. A nut 114" is threadable on the bolt 113". When this type of end cap is used, the slots 109" on each cap are spread and the caps are pushed over the wire. The bolt is then inserted and the nut screwed on to tighten the cap firmly against the line. This obviates the need for a central rod. A split grommet may be used in the slot 109" to adapt this end cap for use on different sizes of lines.

It is also contemplated that end caps similar to those shown in FIGS. 13 through 18, but without slots or notches could be used to secure the plastic tubes in the devices shown for ground or marine use in FIGS. 1 through 10 rather than heat sealing them at their tops.

The marking devices of FIGS. 11 through 18 are particularly adapted for marking power lines and guys in the vicinity of air fields to warn approaching pilots of the lines presence. However, the use of these devices is not so restricted and they can be used at any place where they can be secured to a support to provide visual warning to approaching traffic. As in the case of highway markers, the line markers also provide an optical illusion of rotation to an approaching pilot, making the devices even more attractive, and attention-drawing. This feature is particularly desirable in wire marking in airport facilities for obvious reasons.

In the preferred embodiments tubes have been used to form the members since tubes are easy to manufacture and easy to secure to the base or to the central rod or the end caps. However, it is to be understood that these members can have other than tubular configuration. For example, they may be formed from rods, or they may be formed from flat ribbons of plastic or from any other desired shapes. Also, it is to be understood that for various applications the number of tubes used may vary. Usually there will be at least two tubes defining four circumferentially spaced members but as few as three members could be used and more than four also have been employed.

Having thus described the invention in several embodiments thereof, it is realized that numerous extensive departures may be made from the apparatus described without departing from the scope of the invention as defined in the appended claims.

I claim:

1. A location marking device comprising, a base member arranged to provide support for said device on a surface and an upper member, said upper member including a plurality of elongated members, said members being of a pliant normally self supporting material capable of returning to the original position upon deformation, and means to support said elongated members in an upwardly extending position on said base member in a position wherein at least two of said members lie on noncommon planes and to permit visual sighting through the upper member configuration.

2. The marker of claim 1, wherein said elongated members have interconnecting means at a location above said base member.

3. The marker of claim 1, wherein said elongated members are of arched configuration.

4. The marker of claim 1, wherein said base member includes a plurality of circumferentially spaced support means disposed to engage and support said elongated members.

5. The device of claim 4, wherein said support base is generally annular in shape.

6. A marking device comprising a plurality of spaced elongated interconnected members, at least two of which lie on noncommon planes and defining a series of spaced visible elements, said interconnected members being of a pliant normally self supporting material capable of returning to the original position upon deformation, and means disposed to mount said members in a predetermined position relationship with respect to a support means to permit sighting through the configuration formed by said elements.

7. The device of claim 6 wherein there are first and second sets of said members projecting in opposite directions, and means interconnecting said sets.

8. The device of claim 7 wherein said means interconnecting said sets includes ring means having circumferentially spaced means engaging said elongated members.

9. The device of claim 1 further characterized by means mounting at last a portion of the upper member for relative rotation with respect to the base member.

10. The invention as defined in claim 1 further characterized by said base being at least partially hollow, and means for adding and removing material from said hollow portion.

References Cited

UNITED STATES PATENTS

| 547,119 | 10/1895 | Heaton et al. | 52—2 |
|---|---|---|---|
| 2,481,885 | 9/1949 | Simpson | 182—178 XR |
| 2,561,016 | 7/1951 | Ford et al. | 340—114 XR |
| 2,719,214 | 9/1955 | Potter | 340—114 XR |
| 2,949,531 | 8/1960 | Lemelson | 340—114 XR |
| 2,985,976 | 5/1961 | Parker | 40—39 |
| 3,183,883 | 5/1965 | Ruhlman et al. | 116—114 |
| 3,287,840 | 11/1966 | Keats | 116—63 XR |
| 3,374,763 | 3/1968 | Browning | 46—58 XR |
| 3,380,428 | 4/1968 | Abrams | 116—63 |

FOREIGN PATENTS

| 233,441 | 5/1964 | Austria. |
|---|---|---|
| 891,304 | 3/1962 | Great Britain. |
| 701,422 | 1/1965 | Canada. |
| 820,619 | 8/1937 | France. |
| 992,086 | 7/1951 | France. |

LOUIS J. CAPOZI, Primary Examiner

U.S. Cl. X.R.

94—1.5; 9—9

UNITED STATES PATENT OFFICE
CERTIFICATE OF CORRECTION

Patent No. 3,521,596   Dated June 13, 1967

Inventor(s) Seymour N. Schlein

It is certified that error appears in the above-identified patent and that said Letters Patent are hereby corrected as shown below:

Column 4 line 32 "or" should read -- of --

Column 8 line 4 "last" should read -- least --

SIGNED AND SEALED
FEB 9 1971

(SEAL)
Attest:

Edward M. Fletcher, Jr.
Attesting Officer

WILLIAM E. SCHUYLER, JR.
Commissioner of Patents